June 15, 1937.    K. K. COOPER    2,084,294

CHECK VALVE

Filed Nov. 15, 1934

Inventor:
Kenneth K. Cooper,
by Harry E. Dunham
His Attorney.

Patented June 15, 1937

2,084,294

UNITED STATES PATENT OFFICE 2,084,294

CHECK VALVE

Kenneth K. Cooper, Fort Wayne, Ind., assignor to General Electric Company, a corporation of New York Application November 15, 1934, Serial No. 753,094

5 Claims. (Cl. 183—39)

My invention relates to valves of the cartridge type.

In apparatus of various kinds, particularly refrigerating apparatus, it is desirable to provide a small valve, such as a check valve for example, which can be separately assembled and placed in position as a unitary structure. In case of breakage of the valve it may thus be easily replaced, and the assembly of the apparatus when it is manufactured is also facilitated by its use. Such valves are usually mounted in a recess in a casing or like member and clamped therein by a cap or the like. A gasket must be provided to insure a gas tight connection between the cap and the valve.

An object of my invention is to provide such a valve with a minimum number of parts so as to simplify its manufacture and provide a packing or gasket as a part of the cartridge valve structure. I accomplish this by employing a soft metal member that serves the dual purpose of forming a gasket and of holding the parts of the valve together as a unitary structure.

Further objects and advantages of my invention will become apparent as the following description proceeds, and the features of novelty which characterize my invention will be pointed out with particularity in the claims annexed to and forming a part of this specification.

Figure 1:
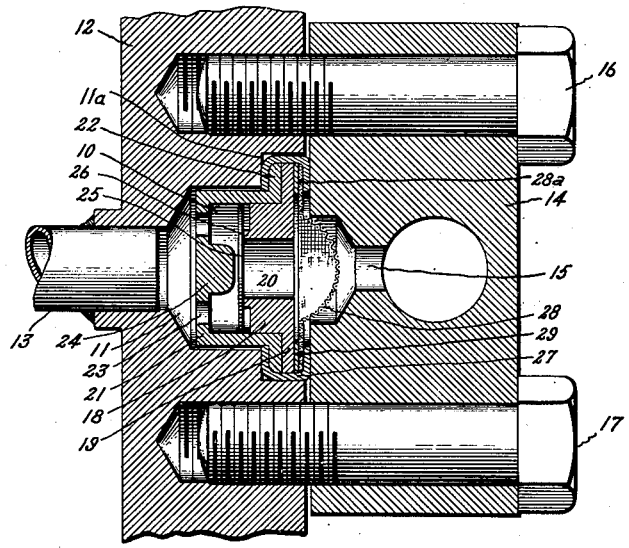
Figure 2:
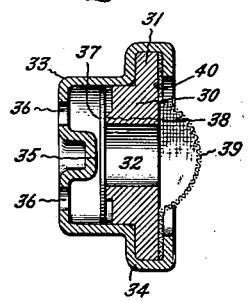

For a better understanding of my invention, reference may be had to the accompanying drawing in which Fig. 1 is a sectional view of a portion of a compressor casing containing a check valve embodying my invention, and Fig. 2 is a side elevation in section of a modified form of check valve embodying my invention.

Referring to the drawing, in Fig. 1, I have shown a check valve 10 embodying my invention, which is mounted in a recess 11 formed in the wall 12 of a casing, such as the end cap of a compressor casing. A compressor suction pipe 13 within the compressor casing communicates with the recess 11. The check valve 10 is held in place by a cap 14 having a passage 15 communicating with the check valve 10, the cap 14 being secured in place by bolts 16 and 17.

The check valve 10 is made in two parts, one part being a cylindrical valve seat plug 18, which has an annular peripheral flange 19 and a cylindrical central opening 20. The second part is a cylindrical, cup-shaped valve retaining case 21, its sides being closely fitted about the body of the seat plug 18. The valve retaining case 21 is provided with an annular flange 22 extending about the open end thereof and closely fitting the flange 19 on the seat plug 18. Passages 23 and an inwardly projecting stop 24 are provided on the base of the valve retaining case 21. The inwardly projecting stop 24 serves to retain a valve disk or element 25 in position and to limit its opening movement. The valve disk 25 is imperforate and cooperates with an annular seat 26 formed on the seat plug 18 to close the opening 20 in the latter. A soft metal gasket portion or ring 27, which may be made of aluminum or the like, is fitted tightly about the peripheral edges of the flanges 19 and 22 on the seat plug 18 and valve retaining case 21, respectively. The edges of the ring 27 are bent around the flanges 19 and 22 thus holding the cup-shaped valve retaining case 21 and the seat plug 18 tightly together to form a unitary structure, the case 21 extending from the gasket portion 27.

The check valve 10 is also provided with a reticulated screen or strainer 28, which serves to prevent dirt or other foreign matter from entering the check valve. The screen 28 is provided with a peripheral flange 28a of the same diameter as that of the flange 19 and is also held in place by the soft metal ring 27. The screen 28 may be spaced from the seat plug 18 by a washer 29.

The soft metal ring 27 not only serves to hold the parts of the check valve 10 together as a unitary structure in the manner described above, but it also serves as a gasket for the check valve 10 seating in the counterbore 11a formed in the wall 12 of the casing and on the cap 14, when the check valve is clamped in the recess 11 in the wall 12 of the casing by the cap 14. A gas-tight connection between the check valve 10, wall 12 of the casing and the cap 14, is thus provided.

During the operation of the check valve described, if the gas pressure in the suction line 13 is reduced the gas in the opening 20 moves the valve disk 25 to the left until it strikes the stop 24 on the valve retaining case 21. The gas is then free to pass from the opening 20, around the edge of the valve disk 25, and into the suction line 13 through the holes 23 formed in the base of the valve retaining case 21. When the gas pressure in the suction line 13 again exceeds the gas pressure in the opening 20, the pressure of the gas on the left side of the valve disk 25 will force the latter to the right until it strikes the seat 26 formed on the seat plug 18, the valve disk 25 being firmly seated thereon in the position shown in the drawing. The opening 20 is thus closed and the passage of gas therethrough prevented.

A modified form of check valve embodying my invention is illustrated in Fig. 2. This check valve is made in two parts also, one part being a cylindrical valve seat plug 30 which has an annular peripheral flange 31 and a cylindrical central opening 32. The second part is a cylindrical cup-shaped valve retaining case 33, made of some soft metal such as aluminum. The sides of the valve retaining case 33 are closely fitted about the body of the seat plug 30. The valve retaining case 33 is provided with an outwardly extending annular portion 34 which is fitted tightly about the peripheral edges of the flange 31 on the plug seat 30. A stop 35 is provided in the base of the retaining case 33 by a centrally located cylindrical depression formed therein and holes 36 for the passage of fluid are provided on each side of the stop 35 in the base of the cup-retaining case 33. The inwardly projecting stop 35 serves to retain an imperforate valve disk 37 in position and to limit its opening movement. The valve disk or element 37 cooperates with an annular valve seat 38 formed on the seat plug 30 to close the opening 32 in the latter. The edge of the valve retaining case 33, which is bent around the flange 31, constitutes a gasket portion and also serves to hold in place a reticulated screen or strainer 39 which extends across the opening 32 in the seat plug 30. The cup-shaped case 33 extends from the gasket portion and is integral therewith. The screen 39 is provided with an annular flange 40 having the same external diameter as the flange 31. This modified form of cartridge valve may be mounted in a recess, in the same manner as the first modification shown in Fig. 1 and described above. The valve retaining case 33 is made of soft metal, such as aluminum, so that it may be easily secured to the seat plug 30 and also in order that it may serve as a gasket to provide a gas tight joint between the valve and its supporting structure.

While I have shown a particular embodiment of my invention, I do not desire my invention to be limited to the particular construction shown and described, and I intend in the appended claims to cover all modifications within the spirit and scope of my invention.

What I claim as new and desire to secure by Letters Patent of the United States is:

1. A valve of the cartridge type comprising a valve seat plug having an opening therein and a valve seat adjacent thereto, an annular flange on said valve seat plug, a cup-shaped case made of soft metal having a portion thereof bent over said flange and cooperating therewith to hold said plug and said case together as a unitary structure, a portion of said case being positioned to form a gasket, and a valve element within said case and cooperating with said seat to close said opening.

2. A check valve of the cartridge type comprising a valve seat plug having an opening therein and a valve seat adjacent thereto, an annular flange on said valve seat plug, a cup-shaped case made of soft metal and having a portion thereof bent over said flange to hold said plug and said case together as a unitary structure, the edge of said case being positioned to form a gasket, and a valve element retained in said case and cooperating with said seat to close said opening.

3. A check valve of the cartridge type comprising a valve seat plug having an opening therein and a valve seat adjacent thereto, an annular flange on said valve seat plug, a reticulated strainer extending across said opening and having a flange adjacent said first mentioned flange, a cup-shaped case made of soft metal and having a portion thereof bent over said flanges to hold said plug and said strainer together as a unitary structure, the edge of said case being positioned to form a gasket, and a valve element retained in position by said case and cooperating with said seat to close said opening.

4. A check valve of the cartridge type comprising a valve seat plug having an opening therein and a valve seat adjacent thereto, an annular flange on said valve seat plug, a cup-shaped case having an inwardly projecting portion in the base thereof, the sides of said case extending about said valve seat plug and providing a flange adjacent said first mentioned flange, a valve element retained in position by the inwardly projecting portion of the case and cooperating with said seat to close said opening, a reticulated strainer extending across said opening and having a flange adjacent said two previously mentioned flanges, and a gasket of soft metal, the edge of said gasket being bent over said flanges and cooperating therewith to hold said plug, said case and said strainer together as a unitary structure.

5. A combined valve and strainer of the cartridge type comprising a valve seat plug having an opening therein and a valve seat adjacent thereto, an annular flange on said valve seat plug, a reticulated strainer extending across said opening and having a flange adjacent said first mentioned flange, a gasket portion made of soft metal bent over said flanges and cooperating therewith to hold said valve seat plug and said strainer together as a unitary structure, said soft metal gasket portion also being positioned to form a gasket, a valve element cooperating with said seat to close said opening, and means including a cup-shaped case extending from said soft metal gasket portion and having an inward projection for retaining said valve element in position adjacent said valve seat.

KENNETH K. COOPER.